(12) United States Patent
Plichta et al.

(10) Patent No.: US 8,021,791 B1
(45) Date of Patent: Sep. 20, 2011

(54) CARBONATE SOLVENT FOR ELECTROLYTES IN LITHIUM AND LITHIUM ION CELLS

(75) Inventors: Edward J. Plichta, Howell, NJ (US); Mary A. Hendrickson, Forked River, NJ (US); Ronald J. Thompson, Howell, NJ (US)

(73) Assignee: The United States of America as represented by the Secretary of the Army, Washingotn, DC (US)

( * ) Notice: Subject to any disclaimer, the term of this patent is extended or adjusted under 35 U.S.C. 154(b) by 951 days.

(21) Appl. No.: 11/809,063

(22) Filed: May 30, 2007

Related U.S. Application Data

(63) Continuation-in-part of application No. 10/768,746, filed on Jan. 27, 2004, now abandoned.

(51) Int. Cl.
*H01M 6/18* (2006.01)

(52) U.S. Cl. ...... 429/322; 429/326; 429/304; 429/231.8
(58) Field of Classification Search ............ 429/322
See application file for complete search history.

(56) References Cited

U.S. PATENT DOCUMENTS

| | | | | |
|---|---|---|---|---|
| 6,475,680 | B1 * | 11/2002 | Arai et al. | 429/340 |
| 6,602,976 | B2 | 8/2003 | Smith et al. | |
| 7,402,260 | B2 * | 7/2008 | Segawa et al. | 252/62.2 |
| 2007/0178379 | A1 * | 8/2007 | Tamura et al. | 429/200 |

* cited by examiner

*Primary Examiner* — Raymond Alejandro
(74) *Attorney, Agent, or Firm* — Michael Zelenka; Stephen J. Harbulak

(57) ABSTRACT

An electrochemical cell includes an anode composed of a salt, a cathode insulated from the anode and a non-aqueous electrolyte in contact with the anode. The electrolyte may include an organic solvent that comprises at least approximately one percent by volume trimethylene carbonate.

3 Claims, 2 Drawing Sheets

CARBONATE SOLVENT FOR ELECTROLYTES IN LITHIUM AND LITHIUM ION CELLS

CONTINUATION-IN-PART

This application is a Continuation-in-Part of U.S. Patent Office application Ser. No. 10/768,746 entitled "Carbonate Solvent For Electrolytes in Lithium And Lithium Ion Cell," which was filed on Jan. 27, 2004 by the inventors herein, now abandoned. This Continuation-in-Part application is being filed under 35 USC §120 and 37 CFR §1.53, and priority from that application is hereby claimed.

GOVERNMENT INTEREST

The invention described herein may be manufactured, used, imported, sold, and licensed by or for the Government of the United States of America without the payment to us of any royalty thereon or therefor.

FIELD OF THE INVENTION

The present invention relates generally to electrolytes for electrochemical cells and, more particularly, to organic solvents used with non-aqueous electrolytes.

BACKGROUND OF THE INVENTION

Electrochemical cells, such as lithium batteries, may contain a non-aqueous electrolyte that includes an organic solvent. Typically, a supporting electrolyte, such as lithium hexafluorophosphate ($LiPF_6$) is dissolved in an organic solvent, e.g., a high dielectric constant cyclic carbonate compound such as ethylene carbonate or propylene carbonate. Also, various volume ratios of low viscosity ester solvents such as diethyl carbonate and dimethyl carbonate may be used to increase ion mobility and provide for a higher conductivity solvent mixture.

Prior art electrochemical cells with similar mixed solvent electrolytes have focused primarily on increasing lithium ion conductivity through the use of combinations of high dielectric constant solvents and low viscosity co-solvents. However, these prior art electrochemical cells suffer from degraded cell performance caused by the anode reducing the solvent and producing an insulating film from these reduction products. Whenever such an insulating film occurs, the anode becomes electrochemically insulated and prevents lithium ions from migrating to the anode when a load is applied to the cell. Similar problems also occur when the solvent oxidizes and decomposes into products that deposit onto the cathode and also produce insulating layer that negates cell operation. Prior art lithium cells lack the ability to prevent formation of the insulating film and resulting electrode impedance.

One particular example of an organic solvent mixture for a battery electrolyte that sought to reduce internal resistance is U.S. Pat. No. 6,566,015. That patent describes a composition that includes at least one type of a cyclic carbonate compound, an alkyl mono-carbonate compound, an alkylene bis-carbonate compound, a glycol diether compound and a phosphorous-containing organic compound. The use of the gycol diether compound is said to lower the internal resistance of the battery as a result of increasing the mobility of lithium ions at the solid-liquid interface. However, it has been found that this composition suffers from the drawback that it is rather complex and difficult to produce.

Thus, there has been a long-felt need for a relatively simple organic solvent mixture for lithium batteries that provides for increased electrochemical cell performance properties, including prevention of the deleterious insulating film with and an increased energy density output of the cell that does not suffer from the disadvantages, limitations and shortcomings of prior art lithium batteries.

SUMMARY OF THE INVENTION

The present invention solves the long-felt need for a simple organic solvent mixture for lithium batteries providing increased electrochemical cell performance that also prevents the formation of the unwanted and deleterious insulation caused by reduction and oxidation products on the anode and cathode by providing kinetically stable lithium ion selective passivation layers on the surface of the lithium or lithium ion interaction electrodes. Additionally, these electrolytes must possess electrochemically stable voltage windows within the oxidation and reduction reaction voltage that occur at both the anode and cathode electrodes. Prior art organic solvent based electrolytes lack these two critical properties.

Despite the continuing focus on achieving increased electrolyte conductivity, the prior art has not embraced the approach of providing stable solutions which possess both stable passivation layers at the electrodes and electrochemical voltage stability in the potential ranges of the electrode reactions. In limited instances where the passivation layer approach has been attempted and an electrolyte forms a stable passivation layer at the electrodes, the resultant film morphology is solvent dependent and seriously degraded cell performance if the aestivation layer impedance increases to a degree which results in an insulating effect on the electrode, thereby degrading cell rate and low temperature performance. Thus, there has been a long-felt need for electrolyte solutions for lithium and lithium ion cells that form a stable passivation layer that is not too thick and does not suffer from any of the shortcomings, disadvantages and limitations of prior art lithium batteries.

In accordance with an embodiment of the present invention, an electrochemical cell comprises an anode and a cathode where the anode and cathode are electrically separated from each other in an electrolyte comprised of a salt and a non-aqueous solvent. The electrolyte may comprise an organic solvent that comprises at least approximately one percent by volume trimethylene carbonate.

In a more particular embodiment of the invention, the organic solvent may comprise a volume percentage of trimethylene carbonate that is greater than approximately 35%.

In another embodiment, the organic solvent may further comprise dimethyl carbonate having a volume percentage that is in the range of between approximately 99% and approximately 1%.

In another particular embodiment of the invention, the organic solvent comprises a volume ratio of 1:1 of trimethylene carbonate and dimethyl carbonate.

In a further particular embodiment, the organic solvent may further comprise at least one material selected from the group consisting of ethylene carbonate, propylene carbonate, dimethyl carbonate, diethyl carbonate and ethyl methyl carbonate.

In still a further particular embodiment, the salt may comprise at least one material from the group consisting of $LiPF_6$, $LiAsF_6$, $LiClO_4$, $LiC(SO_2CF_3)_3$, lithium triflates, lithium imides and lithium methides. All embodiments of the solvents of the present invention overcome the prior art's insulating film problems, shortcomings and difficulties with the key trimethylene carbonate solvent that advantageously provides high dielectric properties for electrolyte conductivity and the critical properties of electrochemical stability to reduction and oxidation over the electrochemical cell voltage range. This invention provides for the formation of a stable passivation film upon the surface of the anode and cathode during electrochemical reduction and oxidation that allows lithium ion intercalation of the anode and cathode and provides kinetic stability of the electrolyte from further reduction and oxidation during cell charging and discharging operation.

BRIEF DESCRIPTION OF THE DRAWINGS

Other objects and advantages of the invention will be evident to those skilled in the art from the following detailed description made with reference to the accompanying drawings, in which.

DETAILED DESCRIPTION OF THE PREFERRED EMBODIMENT

One embodiment of the present invention concerns an electrochemical cell or rechargeable/non-rechargeable battery that includes a cyclic organic solvent for a non-aqueous electrolyte. The organic solvent may comprise trimethylene carbonate ($C_4H_6O_3$) that has a relatively high dielectric constant. It has been found that an especially high energy density output may be attained from a battery containing a non-aqueous electrolyte with such an organic solvent.

Figure 1:
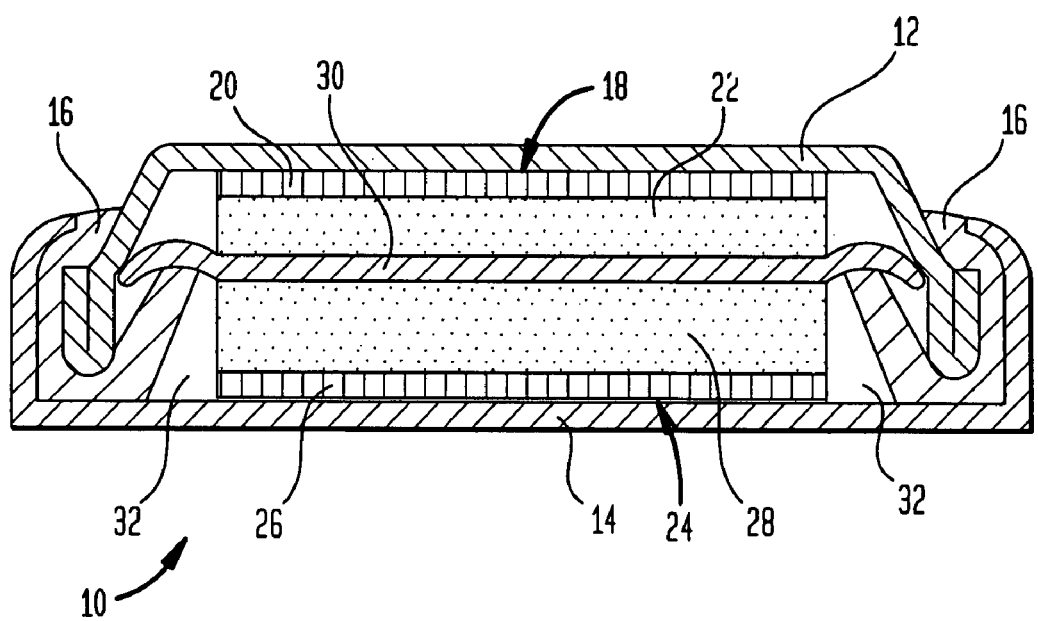
FIG. 1 is a cross-sectional view of a coin-shaped battery comprising a non-aqueous electrolyte in accordance with an embodiment of the present invention.

Referring now to FIG. 1, an electrochemical cell, comprising a non-aqueous electrolyte in accordance with one embodiment of the present invention, is illustrated generally at 10. In this embodiment, the electrochemical cell or battery 10 comprises a negative electrode case 12 and a positive electrode case 14 that are interconnected by an insulating gasket 16 composed of, e.g., polypropylene. It will be recognized that the battery 10 is shown for illustrational purposes only and, e.g., may be rechargeable or non-rechargeable and may function as a primary or secondary cell in accordance with the present invention.

The negative electrode case 12 may be composed of a stainless steel and is in contact with a cathode 18 that comprises a negative collector 20 and a negative charge body 22. The negative collector 20 may be composed of copper and the negative charge body 22 may be composed of carbon powder.

The positive electrode case 14, similar to the negative electrode case 12, may also be formed of a stainless steel and is in contact with an anode 24 that comprises a positive collector 26 and a positive charge body 28. The positive collector 26 may be composed of aluminum and the positive charge body 28 may be composed of a lithium compound such as $LiCoO_2$.

A separator 30, composed of an insulating material, may be disposed between the cathode 18 and the anode 24 and a non-aqueous electrolyte 32, as described in more detail below, may be located in contact with the positive electrode.

The electrolyte 32 comprises a lithium salt and is preferably lithium hexafluorophosphate ($LiPF_6$), although, other lithium salts may be used such as, but not limited to, $LiPF_6$, $LiAsF_6$, $LiClO_4$, $LiC(SO_2CF_3)_3$, lithium triflates, lithium imides, and lithium methides. It will be appreciated that other lithium compounds including lithium ions, lithium alloys and lithium polymers may be employed in accordance with the present invention.

Figure 2:
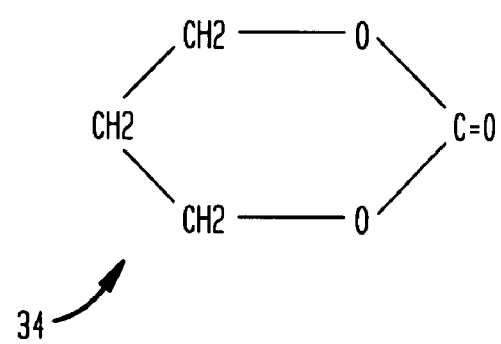
FIG. 2 is a diagram showing the structure and chemical formula of trimethylene carbonate.

In accordance with a feature of this embodiment, the electrolyte 32 also comprises an organic solvent that is preferably trimethylene carbonate ($C_4H_6O_3$), the chemical structure and formula of which are shown generally at 34 in FIG. 2. The organic solvent may comprise a volume percentage of trimethylene carbonate that is at least 1% and may be greater than 35%. The solvent properties of trimethylene carbonate are shown in the following Table.

TABLE

| Solvent | Boiling Point, °C. | Freezing Point, °C. | Dielectric Constant, $\epsilon_{50}$, D |
|---|---|---|---|
| Trimethylene Carbonate, ($C_4H_6O_3$) | 120 | 45 | 73 |

It will be understood that the electrolyte 32 may also comprise an organic solvent mixture comprising trimethylene carbonate and one or more other organic solvents. For example, it has been found that a solvent mixture of trimethylene carbonate and dimethyl carbonate in a 1:1 volume ratio is most preferable, although, other ratios are contemplated. When employed in a solvent mixture, the volume percentage of dimethyl carbonate may range between approximately 99% and approximately 1%. Solvents that may be combined with trimethylene carbonate in the practice of the present invention include, but are not limited to, ethylene carbonate, propylene carbonate, dimethyl carbonate, diethyl carbonate, and ethyl methyl carbonate.

One of this invention's critical features is that the non-aqueous electrolyte 32 that contacts the positive electrode 14, and of particular interest is the ability of electrolyte 32 to form a passive film on the cathode 18 and anode 24 in lithium and lithium ion cells. By including the key trimethylene carbonate solvent in the electrolyte, the present invention solves the prior art disadvantages, shortcomings and limitations caused by the lack of reduction and oxidation and voltage stability and the formation of a stable cathode and anode passivation film of electrolytes used in lithium and lithium ion batteries.

The present invention advantageously provides much-needed electrochemical stability to allow the solvent's use with a lithium ion intercalating anode and cathode. The trimethylene carbonate solvent produces a stable solid electrolyte interface (SEI) layer, not shown in the drawings, at the lithium intercalating anode surface which would only allow lithium ions to diffuse through to the anode. These passivation films form during the initial charge or discharge of the cell in which the electrolyte solutions form reduction products upon the surface of the anode and oxidation products upon the cathode which allow for migration of lithium ions through the film but provide electrochemical protection for the electrolyte from further electrochemical decomposition. These passivation film layers therefore provide kinetic stability to the electrodes.

This SEI layer is needed to protect the anode from reducing the solvent and thereby avoid producing an insulating film which forms from these reduction products on the anode. In prior art lithium batteries, the insulating film the anode becomes electrochemically insulated and prevents lithium ions from migrating to the anode and thus prevents electron transfer, while the cathode can suffer from oxidation products that form a similar insulating film. These two electrochemical processes have been discovered through electrochemical experimentation and are not readily predictable. In accordance with the present invention, other beneficial characteristics of the use of trimethylene carbonate in an electrolyte include the wide voltage stability range it provides to allow the use of high voltage cell couples typically used for lithium and lithium ion cells and high ionic conductivity of the electrolyte solution over a wide temperature range.

The type of film that forms is directly dependant upon the choice of solvents and salt that is used. For lithium ion cells where graphite and carbon anodes are used the need for a solvent in which the reduction reaction produces a lithium carbonate passivation based layer is preferred. The ethylene carbonate solvent will produce, for example, a reduction passivation film on graphite which has the formula $(CH_2OCO_2Li)_2$. However, not all cyclic ester solvents similar to ethylene carbonate will produce such desirable films, such as the case where propylene carbonate does not produce a stable carbonate passivation film on graphite and instead results in the exfoliation of the electrode during the reduction reaction.

Figure 3:
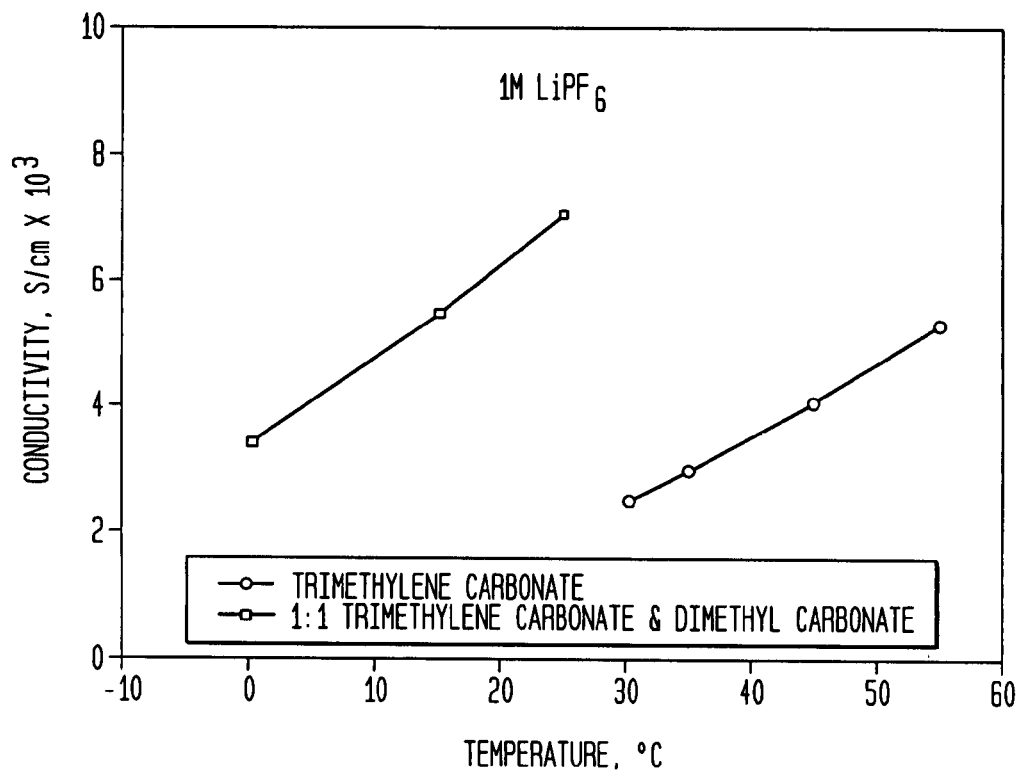
FIG. 3 is a graph showing conductivity versus temperature for two examples of organic solvent compositions, the first example comprising trimethylene carbonate and the second example comprising a mixture of trimethylene carbonate and dimethyl carbonate.

Referring now to FIG. 3, the conductivity versus temperature (° C.) for two example non-aqueous electrolyte solutions are shown. In a first example, a one mole/liter salt solution of lithium hexafluorophosphate ($LiPF_6$) is mixed with trimethylene carbonate having a solvent volume percentage of 100% and, in a second example, a one mole/liter solution of lithium hexafluorophosphate ($LiPF_6$) is mixed with 1:1 volume ratio binary mixture of trimethylene carbonate and dimethyl carbonate the latter having a solvent volume percentage of 50%.

Figure 4:
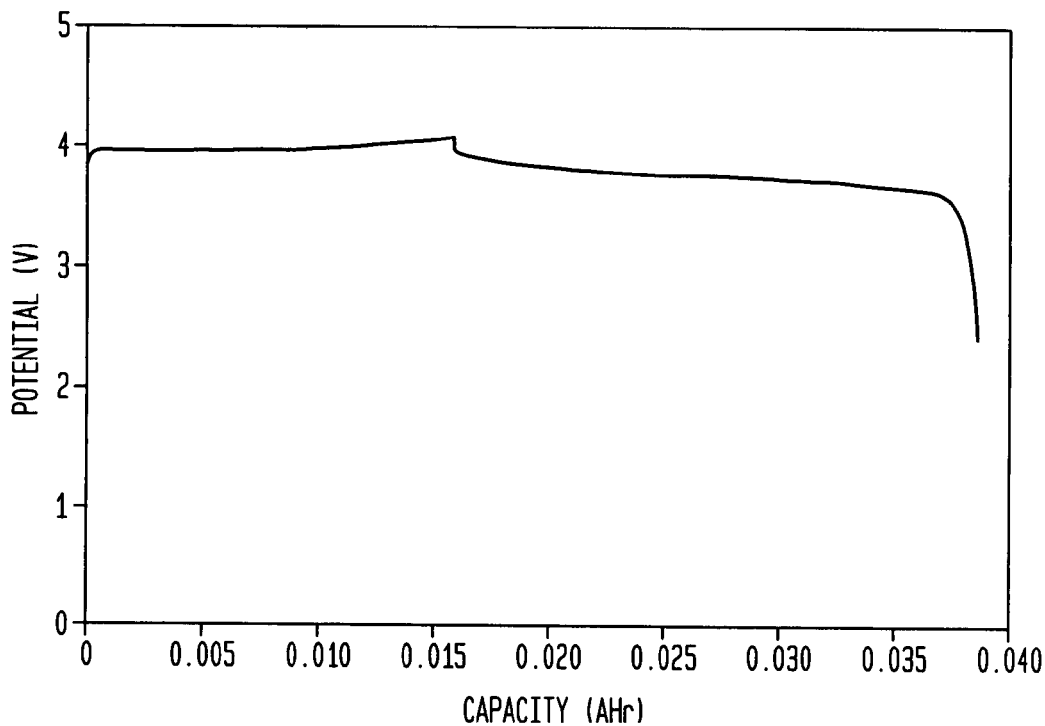
FIG. 4 is a graph showing potential versus capacity for an electrochemical cell including an electrolyte solution comprising a one molar $LiPF_6$ solution combined with the second example mixture of trimethylene carbonate and, dimethyl carbonate.

FIG. 4 illustrates the potential versus capacity for an electrochemical cell that has a positive collector that contains $LiCoO_2$ and comprises an electrolyte solution provided in the second example described above. The cell was cycled at one half (0.5) $mA/cm^2$ between 4.15 and 2.5 volts. While one molar salt solutions are illustrated herein, it will be recognized that higher or lower concentrations of salt may be employed to optimize the solution conductivity and overall cell performance.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims. Accordingly, the present invention should not be limited by the foregoing description, but only by the appended claims.

What we claim is:

1. An electrochemical cell, comprising:
   an anode comprising a salt and an anode surface;
   a cathode insulated from the anode, said cathode having a cathode surface;
   a non-aqueous electrolyte in contact with the anode and consisting of an organic solvent that consists of trimethylene carbonate and dimethyl carbonate;
   said non-aqueous electrolyte produces a stable solid electrolyte interface on said anode surface during an initial discharge of said cell when a plurality of reduction products from upon said anode surface to prevent formation of an insulating film on said anode surface;
   said non-aqueous electrolyte produces said stable solid electrolyte interface on said cathode surface during said initial discharge when a plurality of oxidation products form upon said cathode surface;
   said stable solid electrolyte interface on said anode surface and said cathode surface permits a lithium ion intercalation allowing a plurality of lithium ions to diffuse through to said anode surface and said cathode surface resulting in an increased electron transfer and an enhanced cell performance; and
   said anode being selected from the group of anodes consisting of graphite and carbon.

2. The electrochemical cell, as recited in claim 1, wherein said organic solvent causes a reduction reaction that produces a lithium carbonate passivation layer.

3. An electrochemical cell, comprising:
   an anode comprising a salt and an anode surface;
   a cathode insulated from the anode, said cathode having a cathode surface;
   a non-aqueous electrolyte in contact with the anode and consisting of an organic solvent that consists of trimethylene carbonate and dimethyl carbonate;
   said non-aqueous electrolyte produces a stable solid electrolyte interface on said anode surface during an initial discharge of said cell when a plurality of reduction products from upon said anode surface to prevent formation of an insulating film on said anode surface;
   said non-aqueous electrolyte produces said stable solid electrolyte interface on said cathode surface during said initial discharge when a plurality of oxidation products form upon said cathode surface;
   said stable solid electrolyte interface on said anode surface and said cathode surface permits a lithium ion intercalation allowing a plurality of lithium ions to diffuse through to said anode surface and said cathode surface resulting in an increased electron transfer and an enhanced cell performance; and
   said salt being selected from the group consisting of $LiPF_6$, $LiAsF_6$, $LiClO_4$, $LiC(SO_2CF_3)_3$, lithium triflates, lithium imides, and lithium methides.

* * * * *